US010001548B2

(12) United States Patent
Phillips et al.

(10) Patent No.: US 10,001,548 B2
(45) Date of Patent: Jun. 19, 2018

(54) AMPLITUDE ENVELOPE CORRECTION

(71) Applicant: Navico Holding AS, Egersund (NO)

(72) Inventors: Roger Phillips, Auckland (NZ); Gregor Storz, Auckland (NZ); Lindsay Lilburn, Auckland (NZ)

(73) Assignee: NAVICO HOLDING AS, Egersund (NO)

( * ) Notice: Subject to any disclaimer, the term of this patent is extended or adjusted under 35 U.S.C. 154(b) by 350 days.

(21) Appl. No.: 14/718,064

(22) Filed: May 20, 2015

(65) Prior Publication Data

US 2016/0216366 A1 Jul. 28, 2016

Related U.S. Application Data

(60) Provisional application No. 62/107,335, filed on Jan. 23, 2015.

(51) Int. Cl.
*G01S 7/40* (2006.01)
*G01S 7/282* (2006.01)
(Continued)

(52) U.S. Cl.
CPC ............ *G01S 7/4008* (2013.01); *G01S 7/282* (2013.01); *G01S 7/2921* (2013.01); *G01S 13/28* (2013.01); *G01S 13/9307* (2013.01); *G01S 13/956* (2013.01); *G01S 2007/4013* (2013.01); *Y02A 90/18* (2018.01)

(58) Field of Classification Search
CPC ...... G01S 7/4008; G01S 7/282; G01S 7/2921; G01S 13/28; G01S 13/9307; G01S 13/956; G01S 2007/4013
See application file for complete search history.

(56) References Cited

U.S. PATENT DOCUMENTS 4,021,805 A  5/1977  Effinger et al.
4,028,700 A  6/1977  Carey et al.
(Continued)

FOREIGN PATENT DOCUMENTS

CN    101464513 A    6/2009
JP     2982769 B2   11/1999
(Continued)

OTHER PUBLICATIONS

Pulse Compression; Wikipedia; https://en.wikipedia.org/wiki/Pulse_compression; Dec. 18, 2015 (accessed Jan. 22, 2016) (5 pgs.).
(Continued)

*Primary Examiner* — Frank J McGue
(74) *Attorney, Agent, or Firm* — Nelson Mullins Riley & Scarborough LLP

(57) ABSTRACT

A system that has a chirp generator for emitting signals and an amplitude modulator for shaping the signals emitted by the chirp generator. The signals are shaped using a calibration ramp. The system further includes a Radio Frequency (RF) power amplifier for amplifying the signals shaped by the amplitude modulator, an RF power detector for measuring power levels of the signals amplified by the RF power amplifier, and a pre-distortion coefficient generator for adjusting the measured power levels using power detector calibration coefficients that correspond to the RF power detector.

15 Claims, 4 Drawing Sheets

(51) Int. Cl.
  *G01S 7/292* (2006.01)
  *G01S 13/28* (2006.01)
  *G01S 13/93* (2006.01)
  *G01S 13/95* (2006.01)

(56) References Cited

U.S. PATENT DOCUMENTS

| | | | |
|---|---|---|---|
| 4,047,173 A | 9/1977 | Miller | |
| 4,114,154 A | 9/1978 | Sarfati | |
| 4,123,719 A * | 10/1978 | Hopwood | G01S 13/26 327/5 |
| 4,204,174 A | 5/1980 | King | |
| 4,209,843 A * | 6/1980 | Hyatt | B60R 16/0373 708/422 |
| 4,211,485 A | 7/1980 | Koreicho | |
| 4,216,474 A | 8/1980 | Levine | |
| 4,243,988 A | 1/1981 | Kang et al. | |
| 4,328,495 A | 5/1982 | Thue | |
| 4,353,067 A | 10/1982 | Mims | |
| 4,566,010 A | 1/1986 | Collins | |
| 4,626,853 A | 12/1986 | Lee et al. | |
| 4,686,534 A | 8/1987 | Eddy | |
| 4,772,889 A | 9/1988 | Elleaume | |
| 4,800,388 A | 1/1989 | Okada | |
| 4,929,954 A | 5/1990 | Elleaume | |
| 4,989,010 A | 1/1991 | Crevoulin et al. | |
| 5,003,313 A | 3/1991 | Doriath | |
| 5,128,681 A | 7/1992 | McGroary et al. | |
| 5,141,308 A | 8/1992 | Danckwerth et al. | |
| 5,151,702 A | 9/1992 | Urkowitz | |
| 5,173,706 A | 12/1992 | Urkowitz | |
| 5,309,161 A | 5/1994 | Urkowitz et al. | |
| 5,389,933 A | 2/1995 | Golinsky | |
| 5,414,428 A | 5/1995 | Gallagher et al. | |
| 5,481,270 A | 1/1996 | Urkowitz et al. | |
| 5,926,125 A * | 7/1999 | Wood | G01S 13/106 342/101 |
| 6,067,043 A | 5/2000 | Faure et al. | |
| 6,091,356 A * | 7/2000 | Sanders | G01S 7/282 331/1 R |
| 6,377,204 B1 | 4/2002 | Wurman et al. | |
| 6,433,671 B1 * | 8/2002 | Nysen | G01S 13/755 340/10.1 |
| 6,522,176 B1 | 2/2003 | Davis | |
| 7,019,686 B2 | 3/2006 | Hester et al. | |
| 7,106,250 B2 | 9/2006 | Blunt et al. | |
| 7,675,458 B2 | 3/2010 | Hubbard et al. | |
| 7,688,257 B1 | 3/2010 | Christianson et al. | |
| 7,764,223 B2 | 7/2010 | Wade | |
| 8,022,863 B1 | 9/2011 | Nuthalapati | |
| 8,102,298 B2 | 1/2012 | Feigin et al. | |
| 8,193,972 B2 | 6/2012 | Hofele | |
| 2008/0111734 A1 | 5/2008 | Fam et al. | |
| 2009/0121920 A1 | 5/2009 | Mullarkey et al. | |
| 2012/0262332 A1 | 10/2012 | Ohnishi | |
| 2012/0293361 A1 | 11/2012 | Mowbray et al. | |
| 2015/0247920 A1 | 9/2015 | Asada et al. | |

FOREIGN PATENT DOCUMENTS

| | | |
|---|---|---|
| JP | 2009-128278 A | 6/2009 |
| WO | WO 2014-045927 | 3/2014 |

OTHER PUBLICATIONS

Phase-Locked Loop; Wikipedia; https://en.wikipedia.org/wiki/Phase-locked_loop; Dec. 7, 2015 (accessed Jan. 22, 2016) (12 pgs.).

Direct Digital Synthesizer; Wikipedia; https://en.wikipedia.org/wiki/Direct_digital_synthesizer; Nov. 20, 2015 (accessed Jan. 22, 2016) (3pgs.).

Chirp; Wildpedia; https://en.wikipedia.org/wiki/Chirp; Nov. 14, 2015 (accessed Jan. 22, 2016) (5 pgs.).

Chirp Compression; Wikipedia; https://en.wikipedia.org/wiki/Chirp_compression Oct. 16, 2015 (accessed Jan. 22, 2016) (21 pgs.).

Side Lobe; Wikipedia; https://en.wikipedia.org/wiki/Side_lobe; Sep. 9, 2015 (accessed Jan. 22, 2016) (2 pgs.).

Radio-Frequency Sweep; Wikipedia; https://en.wikipedia.org/wild/radio-frequency_sweep; Dec. 8, 2012 (accessed Jan. 22, 2016) (2 pgs.).

Understanding Direct Digital Synthesis (DDS); National Instruments; http://www.ni.com/white-paper/5516/en/; May 4, 2015 (accessed Jan. 22, 2016) (4 pgs.).

Radar Basics, Pulse Compression; Christian Wolff http://radartutorial.eu/08.transmitters/Intrapulse%20Modulation.en.html; Feb. 27, 2014 (accessed Jan. 22, 2016) (4 pgs.).

U.S. Appl. No. 15/004,764, filed Jan. 22, 2016; In re: Phillips et al.; entitled *Adaptive Frequency Correction for Pulse Compressions Radar*.

U.S. Appl. No. 15/004,752, filed Jan. 22, 2016; In re: Phillips et al; entitled *Frequency Correction for Pulse Compression Radar*.

\* cited by examiner

AMPLITUDE ENVELOPE CORRECTION

CROSS-REFERENCE TO RELATED APPLICATIONS

This application claims the benefit of and priority to U.S. Provisional Patent Application Ser. No. 62/107,335, filed Jan. 23, 2015 and titled PULSE COMPRESSION RADAR CORRECTION, the entire disclosure of which is incorporated herein by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

In radar systems, it would be desirable to have clear and unambiguous indications of the presence of a target. The presence of sidelobes are a common problem that arise in the signal processing of radar systems.

SUMMARY

Various implementations described herein are directed to a method, which has the following steps: generating signals using a chirp generator and shaping the signals using an amplitude modulator. The first input to the amplitude modulator is a calibration ramp. The method may further has the following steps: measuring a capture ramp corresponding to power levels of the signals, applying power detector calibration coefficients to the capture ramp, and generating pre-distortion coefficients by comparing the calibration ramp to the capture ramp.

Various implementations described herein are directed to a method, which has the following steps: emitting Radio Frequency (RF) signals from a radar transmitter comprising an RF power detector, measuring a first set of power levels of the RF signals using a power meter, measuring a second set of power levels of the RF signals using the RF power detector, and generating power detector calibration coefficients by comparing the first set of power levels to the second set of power levels.

Various implementations described herein are directed to a system that has a chirp generator for emitting signals and an amplitude modulator for shaping the signals emitted by the chirp generator. The signals are shaped using a calibration ramp. The system further includes a Radio Frequency (RF) power amplifier for amplifying the signals shaped by the amplitude modulator, an RF power detector for measuring power levels of the signals amplified by the RF power amplifier, and a pre-distortion coefficient generator for adjusting the measured power levels using power detector calibration coefficients that correspond to the RF power detector.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Various implementations of amplitude envelope correction will now be described in more detail with reference to FIGS. 1-4.

Figure 1:
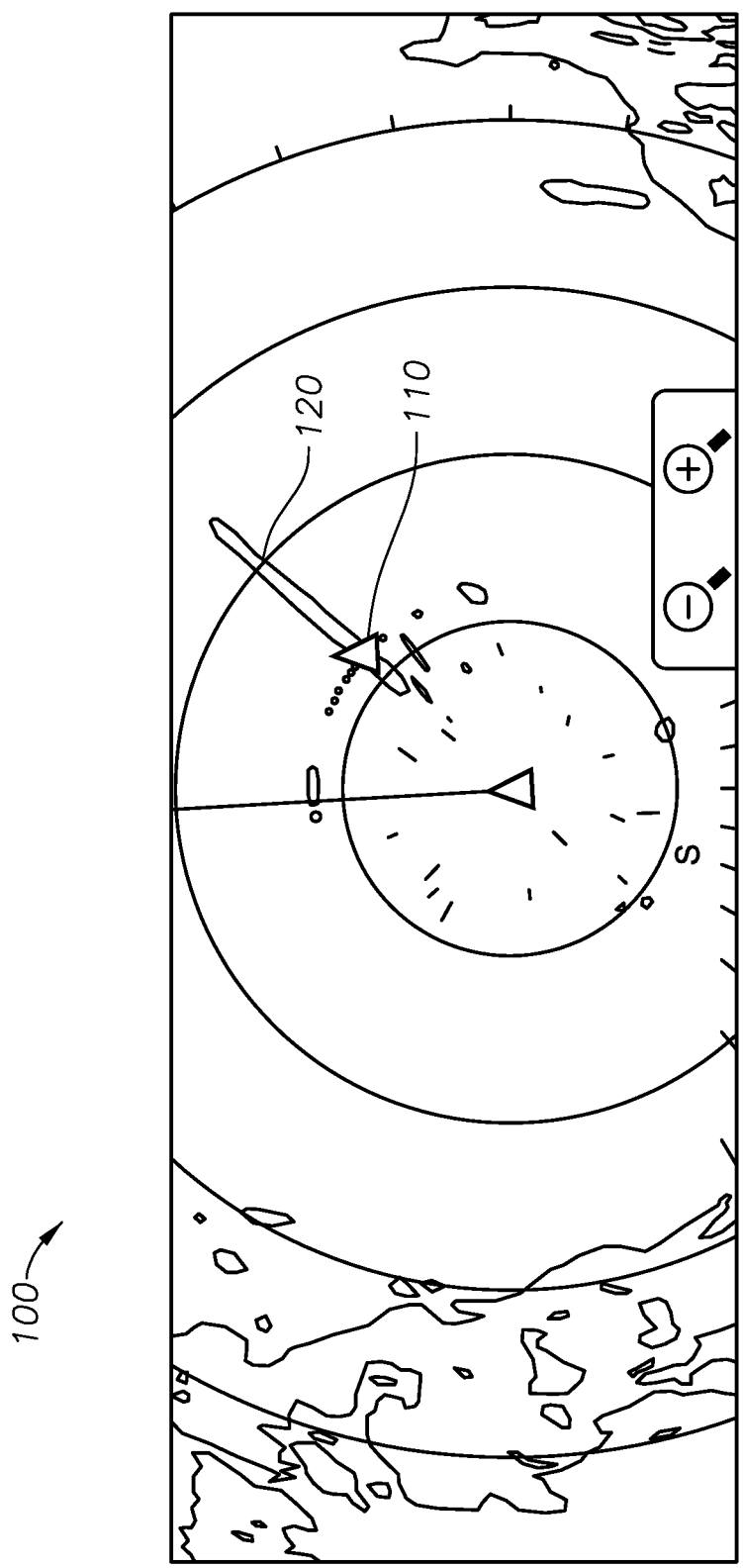
FIG. 1 illustrates a plan position indicator display with range sidelobes in connection with implementations of various techniques described herein.

FIG. 1 illustrates a plan position indicator (PPI) display 100 with range sidelobes in connection with implementations of various techniques described herein. The PPI display 100 is a radar display that illustrates radar return echoes. The PPI display 100 may be continuously updated as radar signals are received.

A point target 110 illustrates a radar return from a relatively large marine vessel. In the illustrated display 100, the point target 110 is stretched into a line 120 on the display. This line 120 may be caused by a range sidelobe. The line 120 may prevent a user from determining whether or not there are objects present in the location of the line 120. For example, the line 120 may hide targets that are on either side of the marine vessel 110. Range sidelobes may occur when a transmitted radar signal does not match a chirp reference signal.

Figure 2:
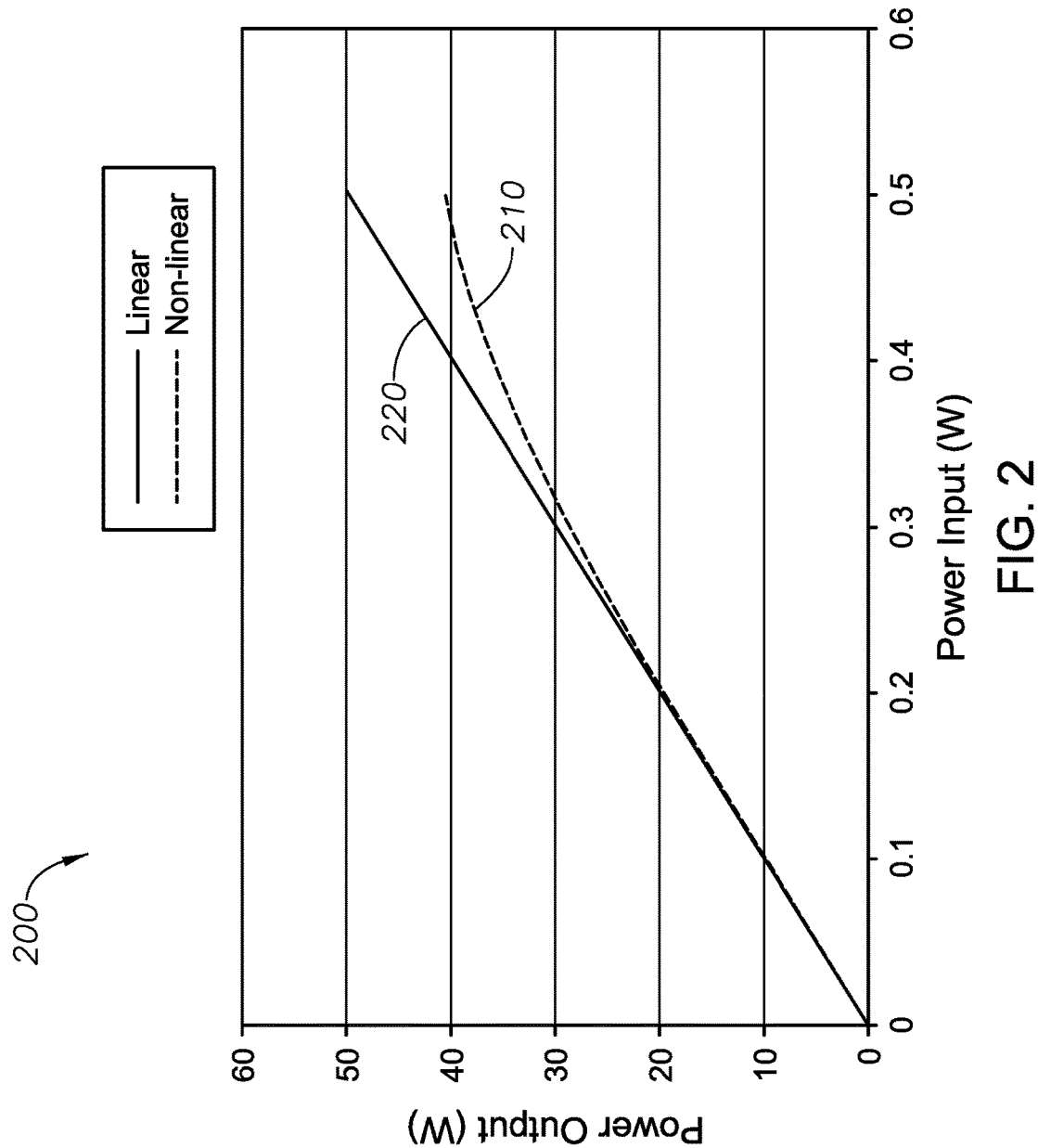
FIG. 2 illustrates a graph of power input and output of a radar transmitter in accordance with implementations of various techniques described herein.
Figure 3:
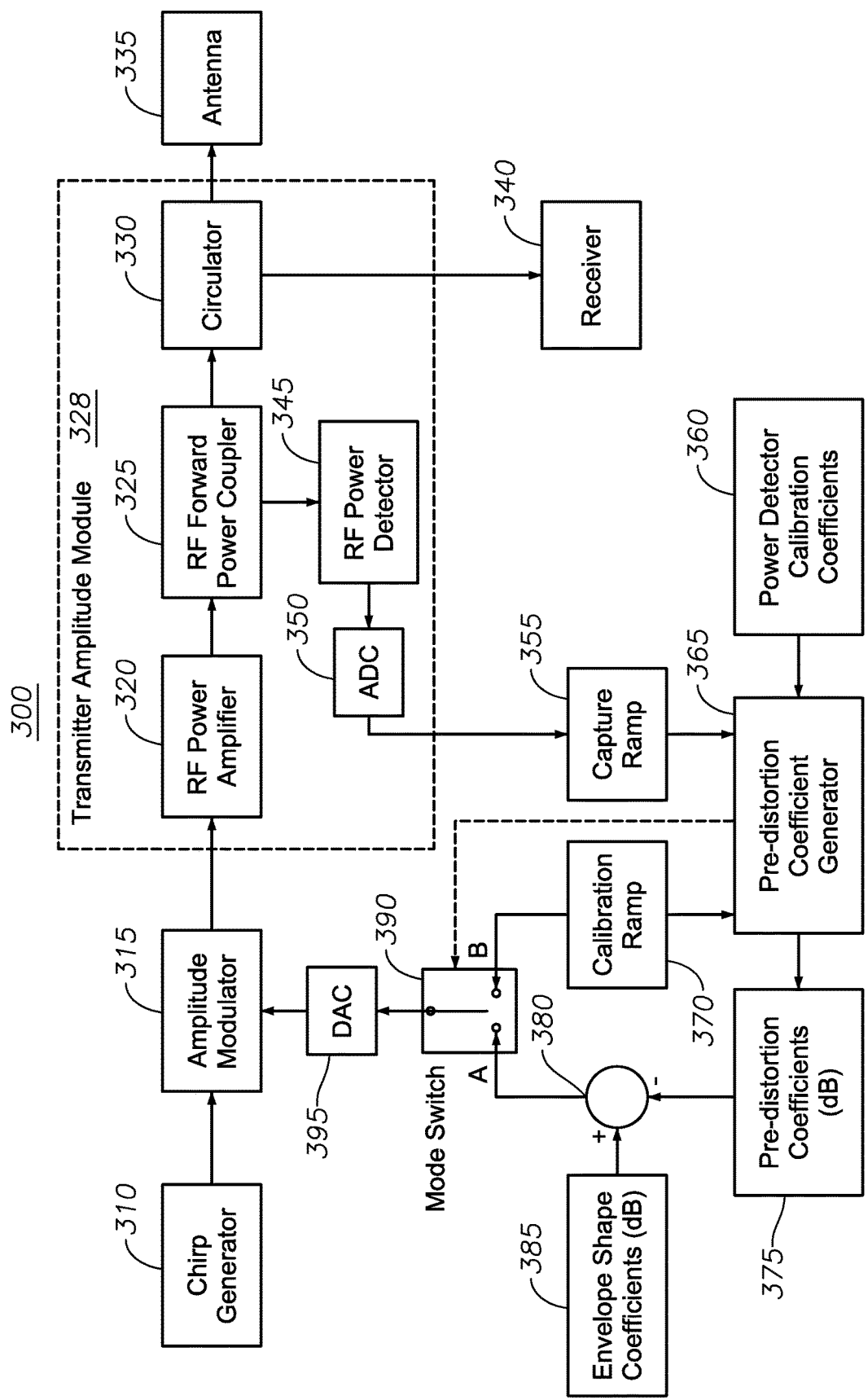
FIG. 3 is a block diagram of a radar transmitter in accordance with implementations of various techniques described herein.

FIG. 2 illustrates a graph 200 of power input and output of a radar transmitter in accordance with implementations of various techniques described herein. FIG. 3, described below, illustrates an example of a radar transmitter. Lines 210 and 220 illustrate the relationship between the power input and output of a radar transmitter. Line 210 shows a non-linear power input to power output relationship of a radar transmitter. A non-linear power input to power output relationship may cause a distortion of the chirp amplitude envelope. The distortion may cause range sidelobe levels to increase. The distortion may also cause increased spectrum use.

Line 220 shows a linear power input to power output relationship of the radar transmitter. A linear or approximately linear power input to power output relationship may reduce range sidelobe levels compared to a non-linear relationship. An amplitude correction system, such as the system illustrated in FIG. 3, may be used in a radar transmitter to linearize the power input to power output relationship. For example, the system illustrated in FIG. 3 may produce a linear power input to power output curve such as line 220.

FIG. 3 is a block diagram of a radar transmitter 300 in accordance with implementations of various techniques described herein. In one implementation, portions of the operations of the radar transmitter 300 may be performed by any computer system 500, any field-programmable gate array (FPGA), application specific integrated circuits ("ASICs"), gate arrays, logic circuits or the like. For instance, the amplitude modulator, the chirp generator, the mode switch or the pre-distortion coefficient generator may be implemented in one or more Field Programmable Gate Arrays.

It should be understood that while the radar transmitter 300 indicates a particular order of execution of operations, in some implementations, certain portions of the operations might be executed in a different order, and on different systems. Further, in some implementations, additional operations or steps may be added to the radar transmitter 300. Likewise, some operations or steps may be omitted.

The radar transmitter 300 may generate signals at a chirp generator 310, shape the signals using an amplitude modulator 315, amplify the signals at an RF power amplifier 320, and transmit the signals using an antenna 335. The radar transmitter 300 may detect power levels of the amplified signals using an RF power detector 345. A transmitter amplitude module 328 of the radar transmitter 300 may comprise the RF power amplifier 320, an RF forward power coupler 325, a circulator 330, the RF power detector 345, and an analog to digital converter (ADC) 350.

Generating Power Detector Calibration Coefficients

One or more sets of power detector calibration coefficients 360 may be generated for the radar transmitter 300. The power detector calibration coefficients 360 may be a calibration table used to adjust power levels measured by the RF power detector 345. The power detector calibration coefficients 360 may map the linearity of power measurement hardware in the radar transmitter 300, such as the RF power detector 345. In one implementation, the power detector calibration coefficients 360 may be generated prior to installing the radar transmitter 300 on a marine vessel. For example, the power detector calibration coefficients 360 may be generated at a production facility where the radar transmitter 300 is assembled. Although various implementations have been described with reference to a marine vessel, it should be understood that some implementations may be used on land, such for monitoring vessels in harbor.

To generate the power detector calibration coefficients 360, a calibrated power meter may be connected to the radar transmitter 300. For example, the antenna 335 may be replaced by a calibrated power meter. The calibrated power meter may have a known linearity or approximate linearity. The calibrated power meter may have absolute level accuracy. The calibrated power meter may have a lower margin of error than the RF power detector 345.

The chirp generator 310 and RF power amplifier 320 may be used as an RF power source when determining the power detector calibration coefficients 360. Alternatively, an external RF power source may be used. Using the chirp generator 310 and RF power amplifier 320, or the external RF power source, RF signals may be generated by the radar transmitter 300 and measured by the calibrated power meter and RF power detector 345. For example, the calibrated power meter and RF power detector 345 may simultaneously or approximately simultaneously measure power levels of signals emitted by the radar transmitter 300. The power levels measured by the calibrated power meter may be compared to the power levels measured by the RF power detector 345. A set of power detector calibration coefficients 360 may be generated based on the comparison between the two sets of measured power levels.

In one implementation, the calibration procedure may be performed at multiple temperatures, and multiple sets of power detector calibration coefficients 360 may be generated, where each set of power detector calibration coefficients 360 corresponds to a specific temperature or a temperature range.

Runtime Calibration Process

The radar transmitter 300 may have a mode switch 390 with a 'position A' and a 'position B'. When the mode switch 390 is set to 'position B,' a runtime calibration process may be performed to generate a set of pre-distortion coefficients 375. The pre-distortion coefficients may be used during normal radar operations, i.e., when the mode switch 390 is set to 'position A,' which will be described below in the section entitled TRANSMIT MODE.

The chirp generator 310 may generate a representation of a chirp reference signal. The chirp generator 310 may generate frequencies without performing any amplitude shaping. For example, the chirp generator 310 may generate a signal with a square amplitude envelope, i.e., a full amplitude square pulse.

The amplitude modulator 315 may shape the amplitude envelope of signals generated by the chirp generator 310. To perform the runtime calibration, a calibration ramp 370, which is a sampled ramp signal that is converted to an analog signal by the DAC 395, may be used by the amplitude modulator 315 to shape the signals generated by the chirp generator 310. The calibration ramp 370 may be a linear function, or another known function. The calibration ramp 370 may have a duration that is less than the chirp pulse generated by the chirp generator 310. The calibration ramp 370 may cover the full control range of the amplitude modulator 315. In one implementation, the calibration ramp 370 may be the actual chirp envelope shape including ramp up and ramp down directions.

The RF power amplifier 320 may amplify the power of signals generated by the chirp generator 310 and shaped by the amplitude modulator 315. The RF power detector 345 may detect an output power level of signals transmitted from the RF power amplifier 320 to the RF forward power coupler 325. The power level of the signals may be referred to as a power output ramp.

Power levels detected by the RF power detector 345 may be converted by an analog to digital converter 350 to generate a capture ramp 355. A pre-distortion coefficient generator 365 may correct, or adjust, the capture ramp 355 using the power detector calibration coefficients 360. Correcting the capture ramp 355 using the power detector calibration coefficients 360 may reduce power input to power output non-linearity in the radar transmitter 300.

The pre-distortion coefficient generator 365 may compare the calibration ramp 370 to the adjusted capture ramp 355 to generate a set of pre-distortion coefficients 375. The pre-distortion coefficients 375 may correspond to the difference between a linear calibration ramp 370 and a non-linear capture ramp 355. The pre-distortion coefficients 375 may be measured in decibels.

The runtime calibration process may be performed at any time when power is applied to the radar system 300. In one implementation, the runtime calibration process may occur during a transition period between standby mode and transmit mode. In this implementation, the runtime calibration process may avoid interruption to radar operation in transmit mode. In another implementation, the runtime calibration process may be triggered by a temperature change, or by an elapsed time since the last runtime calibration was performed.

Transmit Mode

When the mode switch 390 is set to 'position A,' or transmit mode, the radar transmitter 300 may perform normal operations, i.e., transmit and receive radar signals.

The pre-distortion coefficients 375 may be applied to the envelope shape coefficients 385, converted by the DAC 395, and used by the amplitude modulator 315 to shape signals from the chirp generator 310. The envelope shape coefficients 385 may be measured in decibels. The envelope shape coefficients 385 may correspond to a desired shape for signals transmitted by the radar transmitter 300. By applying the pre-distortion coefficients 375 to the envelope shape coefficients 385, the amplitude modulator 315 may pre-distort the amplitude of the signal from the chirp generator 310 to reduce, cancel, or compensate for distortion produced by the transmitter amplitude module 328. Applying the pre-distortion coefficients 375 to the envelope shape coefficients 385 may reduce power input to power output non-linearity in the radar transmitter 300.

In one implementation, the pre-distortion coefficients 375 may be subtracted from the envelope shape coefficients 385. In another implementation, if the pre-distortion coefficients 375 are in a linear form, the envelope shape coefficients 385 may be divided by the pre-distortion coefficients 375. In yet another implementation, the pre-distortion coefficients 375 may be inverted and multiplied by the envelope shape coefficients 385.

The RF power amplifier 320 may be used to amplify the power of the signals generated by the chirp generator 310 and shaped by the amplitude modulator 315. The RF forward power coupler 325 may simultaneously provide a signal to the circulator 330 and a signal to the RF power detector 345.

During the transmit operation, a high power amplitude linearized chirp may be transmitted by the circulator 330 and radiated by the antenna 335. Echoes from targets in the antenna beam may be processed by the receiver 340. The echoes may be correlated with the envelope shape coefficients 385, to produce compressed pulses that represent target range and amplitude. The reference chirp signal may be equal to an ideal transmitted chirp signal.

Computing System

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, marine electronics devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems.

The various technologies described herein may also be implemented in distributed computing environments where tasks are performed by remote processing devices that are linked through a communications network, e.g., by hard-wired links, wireless links, or combinations thereof. In a distributed computing environment, program modules may be located in both local and remote computer storage media including memory storage devices.

Figure 4:
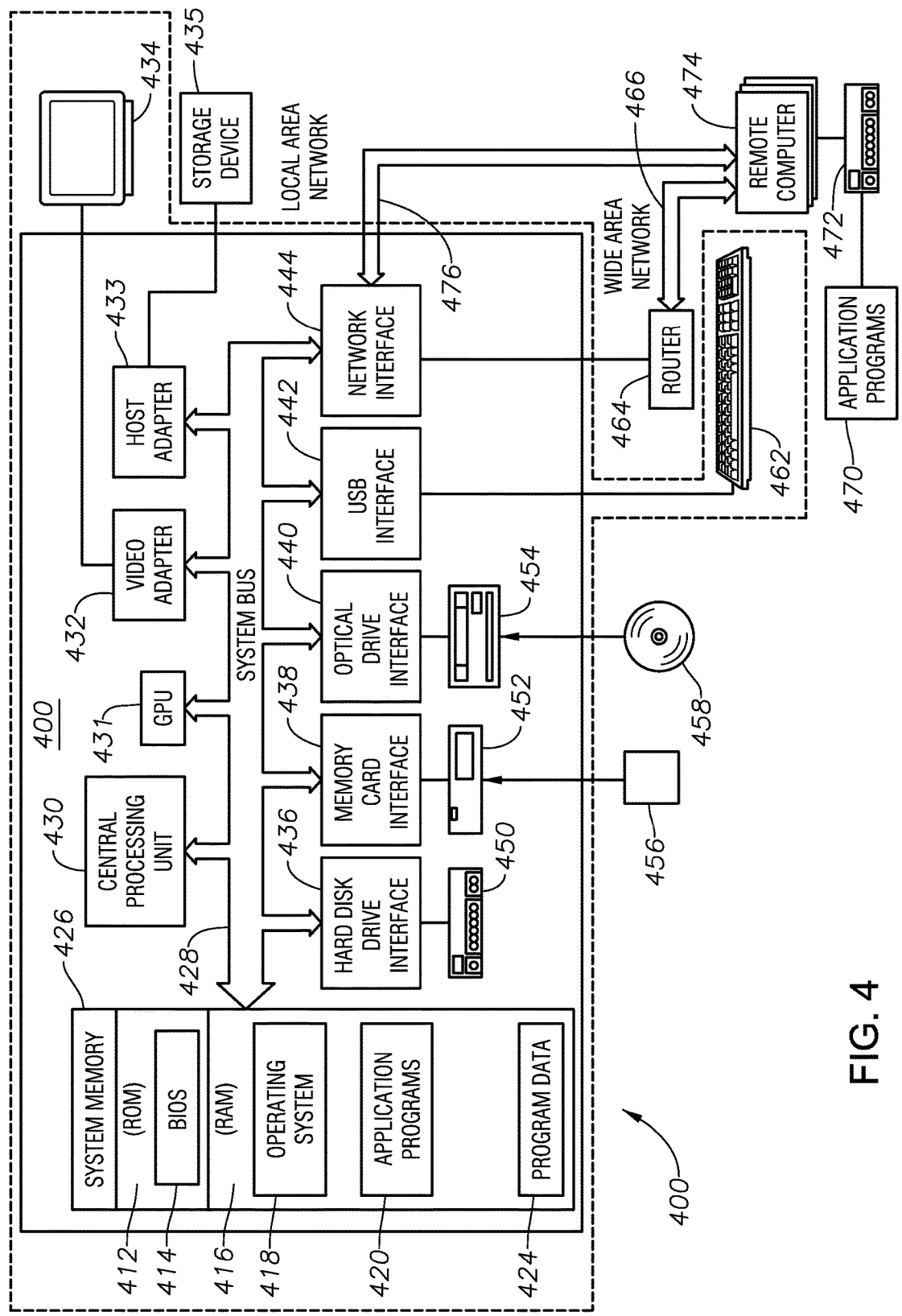
FIG. 4 illustrates a schematic diagram of a computing system in which various technologies described herein may be incorporated and practiced.

FIG. 4 illustrates a computer system 400 into which implementations of various technologies and techniques described herein may be implemented. Computing system 400 may be a conventional desktop, a handheld device, a wearable device, a controller, a personal digital assistant, a server computer, an electronic device/instrument, a laptop, a tablet, or part of a navigation system, marine electronics, radar system, or sonar system. It should be noted, however, that other computer system configurations may be used.

The computing system 400 may include a central processing unit (CPU) 430, a system memory 426 and a system bus 428 that couples various system components including the system memory 426 to the CPU 430. Although only one CPU 430 is illustrated in FIG. 4, it should be understood that in some implementations the computing system 400 may include more than one CPU 430.

The CPU 430 can include a microprocessor, a microcontroller, a processor, a programmable integrated circuit, or a combination thereof. The CPU 430 can comprise an off-the-shelf processor such as a Reduced Instruction Set Computer (RISC), including an Advanced RISC Machine (ARM) processor, or a Microprocessor without Interlocked Pipeline Stages (MIPS) processor, or a combination thereof. The CPU 430 may also include a proprietary processor. The CPU may include a multi-core processor.

The CPU 430 may provide output data to a Graphics Processing Unit (GPU) 431. The GPU 431 may generate graphical user interfaces that present the output data. The GPU 431 may also provide objects, such as menus, in the graphical user interface. A user may provide inputs by interacting with the objects. The GPU 431 may receive the inputs from interaction with the objects and provide the inputs to the CPU 430. In one implementation, the CPU 430 may perform the tasks of the GPU 431. A video adapter 432 may be provided to convert graphical data into signals for a monitor 434, which may also be referred to as a screen. The monitor 434 can be sensitive to heat or touching (now collectively referred to as a "touch screen"). In one implementation, the computer system 400 may not include a monitor 434.

The GPU 431 may be a microprocessor specifically designed to manipulate and implement computer graphics. The CPU 430 may offload work to the GPU 431. The GPU 431 may have its own graphics memory, and/or may have access to a portion of the system memory 426. As with the CPU 430, the GPU 431 may include one or more processing units, and each processing unit may include one or more cores.

The system bus 428 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 426 may include a read only memory (ROM) 412 and a random access memory (RAM) 416. A basic input/ output system (BIOS) 414, containing the basic routines that help transfer information between elements within the computing system 400, such as during start-up, may be stored in the ROM 412. The computing system may be implemented using a printed circuit board containing various components including processing units, data storage memory, and connectors.

Certain implementations may be configured to be connected to a GPS and/or a sonar system. The GPS and/or sonar system may be connected via the network interface 444 or Universal Serial Bus (USB) interface 442. In one implementation, the computing system 400, the monitor 434, the screen 405 and buttons may be integrated into a console.

The computing system 400 may further include a hard disk drive 436 for reading from and writing to a hard disk 450, a memory card reader 452 for reading from and writing to a removable memory card 456 and an optical disk drive 454 for reading from and writing to a removable optical disk 458, such as a CD ROM, DVD ROM or other optical media. The hard disk drive 450, the memory card reader 452 and the optical disk drive 454 may be connected to the system bus 428 by a hard disk drive interface 436, a memory card interface 438 and an optical drive interface 440, respectively. The drives and their associated computer-readable media may provide nonvolatile storage of computer-readable instructions, data structures, program modules and other data for the computing system 400.

Although the computing system 400 is described herein as having a hard disk 450, a removable memory card 456 and a removable optical disk 458, it should be appreciated by those skilled in the art that the computing system 400 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, including a Solid State Disk (SSD), CD-ROM, digital versatile disks (DVD), or other optical storage, magnetic cassettes, magnetic tape, magnetic disk storage or other magnetic storage devices, or any other medium which can be used to store the desired information and which can be accessed by the computing system 400. Communication media may embody computer readable instructions, data structures, program modules or other data in a modulated data signal, such as a carrier wave or other transport mechanism and may include any information delivery media. By way of example, and not limitation, communication media may include wired media such as a wired network or direct-wired connection, and wireless media such as acoustic, RF, infrared and other wireless media. The computing system 400 may also include a host adapter 433 that connects to a storage device 435 via a small computer system interface (SCSI) bus, a Fiber Channel bus, an eSATA bus, or using any other applicable computer bus interface. The computing system 400 can also be connected to a router 464 to establish a wide area network (WAN) 466 with one or more remote computers 474. The router 464 may be connected to the system bus 428 via a network interface 444. The remote computers 474 can also include hard disks 472 that store application programs 470.

In another implementation, the computing system 400 may also connect to one or more remote computers 474 via local area network (LAN) 476 or the WAN 466. When using a LAN networking environment, the computing system 400 may be connected to the LAN 476 through the network interface or adapter 444. The LAN 476 may be implemented via a wired connection or a wireless connection. The LAN 476 may be implemented using Wi-Fi technology, cellular technology, or any other implementation known to those skilled in the art. The network interface 444 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 474. It will be appreciated that the network connections shown are exemplary and other means of establishing a communications link between the computer systems may be used. The network interface 444 may also include digital cellular networks, Bluetooth, or any other wireless network interface.

A number of program modules may be stored on the hard disk 450, memory card 456, optical disk 458, ROM 412 or RAM 416, including an operating system 418, one or more application programs 420, program data 424 and a database system. The operating system 418 may be any suitable operating system that may control the operation of a networked personal or server computer, such as Windows® XP, Mac OS® X, Unix-variants (e.g., Linux® and BSD®), Android®, iOS®, and the like.

A user may enter commands and information into the computing system 400 through input devices such as a keyboard 462 and pointing device. Other input devices may include a microphone, joystick, game pad, satellite dish, scanner, user input button, wearable device, or the like. These and other input devices may be connected to the CPU 430 through a USB interface 442 coupled to system bus 428, but may be connected by other interfaces, such as a parallel port, Bluetooth or a game port. A monitor 405 or other type of display device may also be connected to system bus 428 via an interface, such as a video adapter 432. In addition to the monitor 434, the computing system 400 may further include other peripheral output devices such as speakers and printers.

It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. Nothing in this application is considered critical or essential to the claimed invention unless explicitly indicated as being "critical" or "essential."

Reference has been made in detail to various implementations, examples of which are illustrated in the accompanying drawings and figures. In the detailed description, numerous specific details are set forth in order to provide a thorough understanding of the present disclosure. However, it should be apparent to one of ordinary skill in the art that the present disclosure may be practiced without these specific details. In other instances, well-known methods, procedures, components, circuits and networks have not been described in detail so as not to unnecessarily obscure aspects of the implementations.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It should also be understood that the term "and/or" as used herein refers to and encompasses any and all possible combinations of one or more of the associated listed items. It should be further understood that the terms "includes," "including," "comprises" and/or "comprising," when used in this specification, specify the presence of stated features, integers, steps, operations, elements, and/or components, but should not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

"Alternatively" should not be construed to only pertain to situations where the number of choices involved is exactly two, but rather refers to another possibility among many other possibilities.

Additionally, various technologies and techniques described herein include receiving user requests for a number of different operations. In certain instances, the user request for a particular operation will be explicitly described. It should be understood that a "request" or "can request" can also include, but are not limited to, touching a screen, double tapping a screen (tapping the screen twice in rapid succession), pressing a particular physical or virtual button, making a selection from a menu, swiping the screen (placing a finger towards an edge of the screen and traversing the screen while maintaining contact between the finger and the screen) placement of a cursor at a particular location, stylus pointing, mouse selection, an audible command, as well as the explicit description of the "request" for the particular operations.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for producing one or more radar signals, the method comprising:
    generating at least one first signal using a chirp generator, wherein the at least one first signal includes a full amplitude square pulse;
    shaping the at least one first signal using an amplitude modulator by applying, via a digital-to-analog converter, a calibration ramp, wherein the calibration ramp has a duration of less than a duration of the square pulse and is sufficient to cover the full control range of the amplitude modulator;
    detecting a power output level of the at least one first signal;
    generating a capture ramp corresponding to the at least one first signal by applying an analog-to-digital converter to the detected power output level of the at least one first signal;
    applying one or more power detector calibration coefficients to the capture ramp to form an adjusted capture ramp corresponding to the at least one first signal, wherein the power detector calibration coefficients are generated during a calibration process and used to adjust the detected power output level of the at least one first signal;
    generating one or more pre-distortion coefficients by comparing the calibration ramp to the adjusted capture ramp;
    applying the one or more pre-distortion coefficients to one or more envelope shape coefficients to form one or more adjusted envelope shape coefficients;
    generating at least one second signal using the chirp generator;
    shaping the at least one second signal using the amplitude modulator by applying, via the digital-to-analog converter, the one or more adjusted envelope shape coefficients to shape the at least one second signal to pre-distort the at least one second signal to account for distortion produced by a transmitter amplitude module; and
    producing one or more radar signals from an antenna using the shaped at least one second signal.

2. The method of claim 1, wherein the power detector calibration coefficients are generated by comparing power level measurements of a Radio Frequency (RF) power detector and a calibrated power meter.

3. The method of claim 1, wherein the capture ramp is measured by a Radio Frequency (RF) power detector.

4. The method of claim 3, wherein the power detector calibration coefficients correspond to the RF power detector.

5. The method of claim 1, wherein applying power detector calibration coefficients to the capture ramp comprises using a calibration table to modify the capture ramp.

6. The method of claim 1, wherein applying the one or more pre-distortion coefficients to one or more envelope shape coefficients comprises:
    subtracting the one or more pre-distortion coefficients from the envelope shape coefficients.

7. The method of claim 1, wherein the power detector calibration coefficients are selected from a plurality of power detector calibration coefficients and the selection is based at least in part on a measured temperature.

8. The method of claim 1, wherein the calibration ramp is a linear function or a chirp envelope shape including ramp up and ramp down directions.

9. The method of claim 1, wherein the power detector calibration coefficients are generated at a factory or production facility and the pre-distortion coefficients are generated on a marine vessel.

10. A system for producing one or more radar signals, the system comprising:
   a chirp generator configured to emit signals, wherein the chirp generator is configured to emit at least one first signal that includes a full amplitude square pulse, wherein the chirp generator is configured to emit at least one second signal;
   an amplitude modulator configured to shape the emitted signals from the chirp generator, wherein the amplitude modulator is configured to shape the at least one first signal by applying, via a digital-to-analog converter, a calibration ramp, wherein the calibration ramp has a duration of less than a duration of the square pulse and is sufficient to cover the full control range of the amplitude modulator;
   a Radio Frequency (RF) power amplifier configured to amplify the signals shaped by the amplitude modulator;
   an RF power detector configured to detect a power output level of the at least one first signal;
   a capture ramp generator configured to generate a capture ramp corresponding to the at least one first signal by applying an analog-to-digital converter to the detected power output level of the at least one first signal;
   a pre-distortion coefficient generator configured to apply one or more power detector calibration coefficients to the capture ramp to form an adjusted capture ramp corresponding to the at least one first signal, wherein the power detector calibration coefficients are generated during a calibration process and used to adjust the detected power output level of the at least one first signal, wherein the pre-distortion coefficient generator is configured to generate one or more pre-distortion coefficients by comparing the calibration ramp to the adjusted capture ramp;
   wherein the amplitude modulator is configured to shape the at least one second signal by applying, via the digital-to-analog converter, one or more adjusted envelope shape coefficients to shape the at least one second signal to pre-distort the at least one second signal to account for distortion produced by a transmitter amplitude module, wherein the one or more adjusted envelope shape coefficients are formed based on application of the one or more pre-distortion coefficients to one or more envelope shape coefficients; and
   an antenna configured to produce one or more radar signals using the shaped at least one second signal.

11. The system of claim 10, wherein the pre-distortion coefficients and power detector calibration coefficients are configured to reduce power input to power output non-linearity in the system.

12. The system of claim 10, wherein the amplitude modulator is configured to receive input from the digital-to-analog converter (DAC), wherein the RF power amplifier is connected to an RF forward power coupler, and wherein the RF forward power coupler is connected to the RF power detector.

13. The system of claim 12, wherein the calibration ramp is an input to the DAC.

14. The system of claim 10, wherein the power detector calibration coefficients are determined from a calibration table.

15. The system of claim 10, wherein at least one of the amplitude modulator, the chirp generator, and the pre-distortion coefficient generator is implemented in one or more Field Programmable Gate Arrays.

* * * * *